July 11, 1939. H. VERKINDEREN 2,165,739
CASSETTE FOR CINEMATOGRAPHIC CAMERAS
Filed July 30, 1938
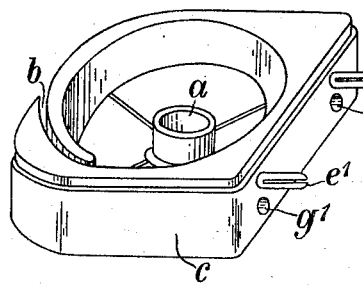
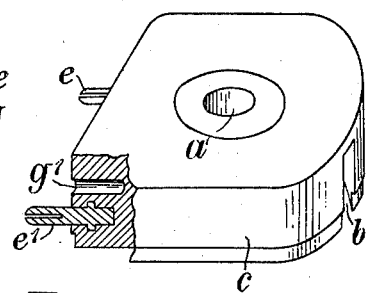
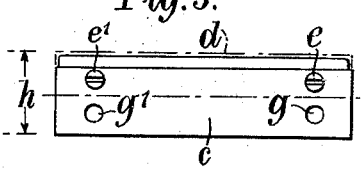
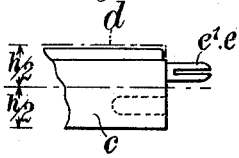
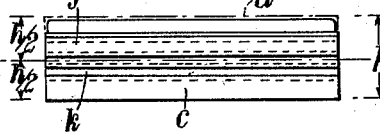
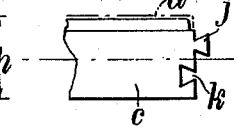
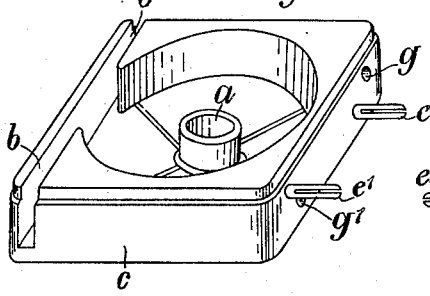
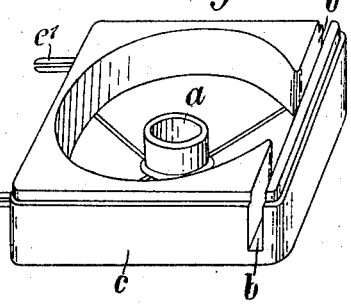
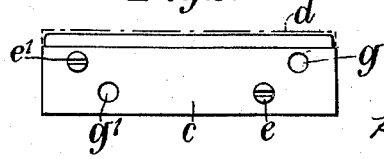

Patented July 11, 1939

2,165,739

UNITED STATES PATENT OFFICE 2,165,739

CASSETTE FOR CINEMATOGRAPHIC CAMERAS

Honoré Verkinderen, Mortsel, near Antwerp, Belgium, assignor to Gevaert Photo-Producten N. V., Oude-God, Antwerp, Belgium Application July 30, 1938, Serial No. 222,281
In Austria August 27, 1937

2 Claims. (Cl. 242—71)

This invention relates to cassettes for cinematographic photographic apparatus, particularly to cassettes for amateur cinematographic cameras.

In many of these cameras the loading is effected nowadays by means of double cassettes, that is to say, cassettes that comprise winding and unwinding chambers. Such cassettes present the advantage that the loading of the camera can be effected very quickly and in daylight. These double cassettes present on the other hand the disadvantage of taking up a great deal of room, and of being expensive.

Various systems of individual cassettes have also been prepared, which can be assembled in pairs so as to form a double cassette. In certain of the systems hitherto known the said assembling is effected by means of an intermediate member which, although it can be used repeatedly, makes the assembling of the individual cassettes more or less complicated.

The object of the invention is to provide individual cassettes so formed that each may be directly engaged with another similar cassette to form a double cassette of the kind having centering sleeves spaced apart in the direction of the line of travel of the film and with their axes parallel.

According to the invention, the individual cassettes are each furnished on the section of its peripheral wall designed to be brought against the corresponding section of the peripheral wall of a similar cassette with a like number of interengaging connecting elements, for instance, a like number of connecting pins and connecting sleeves which are so positioned in relation to the horizontal or vertical centre line of the said section, that in a symmetrical position one connecting pin, for instance, always comes opposite to a connecting sleeve.

The individual cassette can thus conveniently be united with another cassette of the same type to form a double cassette. In order to do this all that is necessary is to rotate one cassette in relation to the other about the horizontal or vertical centre line of the side that carries the connecting elements through 180°. The rotation is effected about the horizontal centre line or the vertical centre line according as the connecting elements are symmetrically arranged in relation to the horizontal or the vertical centre line. In the first-mentioned case, after the assembling of the two cassettes, in the case of one cassette the lid is located above and in the case of the other underneath. If, however, the rotation is effected about the vertical centre line the lids of both cassettes are located after assembling on the same side.

The invention will be described further in detail and by way of example with reference to the accompanying drawing in which certain constructions are illustrated.

In certain of the constructions the connecting elements are of the pin and socket type but it is to be understood that the invention is in no way restricted to cassettes furnished with such connecting elements.

In the drawing,

Figures 1 and 2 are views in perspective illustrating two cassettes of similar form in the relative positions in which they will be placed immediately prior to engaging them one with the other or immediately after disengaging them one from the other;

Figure 3 is a view in elevation of a face of the cassette in which fastening means are provided;

Figure 4 is a fragmentary view in side elevation of the cassette;

Figures 5 and 6 are corresponding views of an alternative construction of cassette;

Figures 7 and 8 illustrate a cassette generally similar to that illustrated in Figures 1 to 4 but having the connecting means differently arranged;

Figure 9 being a view of the face of one of such cassettes.

In Figures 1 and 2, 7 and 8, $a$ is the centering sleeve of the cassette and $b$ is the slot through which the film passes and which may in known manner be lined partially or throughout its length with velvet in order that a better degree of light tightness may be secured, $c$ in all of the figures representing the body of the cassette, and $d$ in Figures 3 to 6 indicating the cover plate which is secured in position after the film has been loaded into the cassette and which is subsequently removed to enable the exposed film to be withdrawn.

In the constructions illustrated in Figures 1, 2, 3, 4, 7, 8 and 9, the connecting elements are in the form of pins $e$, $e'$ and sockets or sleeves $g$, $g'$, while in the case of the construction illustrated in Figures 5 and 6 one face of each of the cassettes is furnished with a dovetail projecting rib $j$ and a dovetail groove $k$ so that by taking two of such cassettes the rib on each may be engaged by a sliding action in the groove of the other.

In the case of the constructions illustrated in Figures 1 and 2, the connecting elements are symmetrically arranged in relation to the horizontal centre-line of the side of the cassette and the two individual cassettes are shown in the position in which they must be placed to enable them to be engaged together to form a double cassette.

In this case, as will be seen, the side of the cassette with which the cover is engaged is, in the case of one cassette, directed upward and in the case of the other cassette is directed downward.

Figures 7 and 8 show the two individual cassettes in the position in which they must be placed in order that they may be engaged one with the other.

In this case the sides of each of the cassettes with which the cover is engaged are directed upward.

In Figures 3, 5 and 6 $h$ represents the height or the thickness of the cassette including its cover and the centre line.

I claim:

1. A single chamber cassette for cinematograph film having therein a film slot and a film centering sleeve for the film adapted to be assembled with a second cassette of the same construction to form a double chamber cassette of the kind having the centering sleeves spaced apart in the direction of the line of travel of the film and with their axes parallel comprising in one section of the peripheral wall of the chamber a number of projecting engaging elements and a like number of recessed engaging elements so positioned that when the section of the peripheral wall of said cassette is brought against the like section of the peripheral wall of a second cassette having the like number of each type of such engaging elements similarly positioned, the projecting elements of each will be engaged in the recessed engaging elements of the other and the limits of the two sections of the peripheral walls of the two cassettes provided with such engaging elements will coincide and the film slots of the two sections will be positioned to permit the film to be withdrawn from one section and rewound in the other section.

2. A single chamber cassette for cinematograph film having therein a film slot and a film centering sleeve for the film adapted to be assembled with a second cassette of the same construction to form a double chamber cassette of the kind having the centering sleeves spaced apart in the direction of the line of travel of the film and with their axes parallel comprising in one section of the peripheral wall of the chamber a number of pins and a like number of sockets so positioned that when the said section of the peripheral wall of the cassette is brought against the like section of the peripheral wall of a second cassette having the like number of pins and sockets similarly positioned, the pins on each cassette will be engaged in the sockets of the other and the limits of the two sections of the peripheral walls of the two cassettes will coincide and the film slots of the two sections will be positioned to permit the film to be withdrawn from one section and rewound in the other section.

HONORÉ VERKINDEREN.